March 5, 1968

C. W. LYTLE ETAL 3,372,291

MOTOR DRIVES FOR CONTROL RODS OF REACTORS, AND THE LIKE

Original Filed June 20, 1960

Inventors:
Chester W. Lytle,
Robert V. Suhrke &
William A. Bradley,
by Thos. A. Banning
Atty

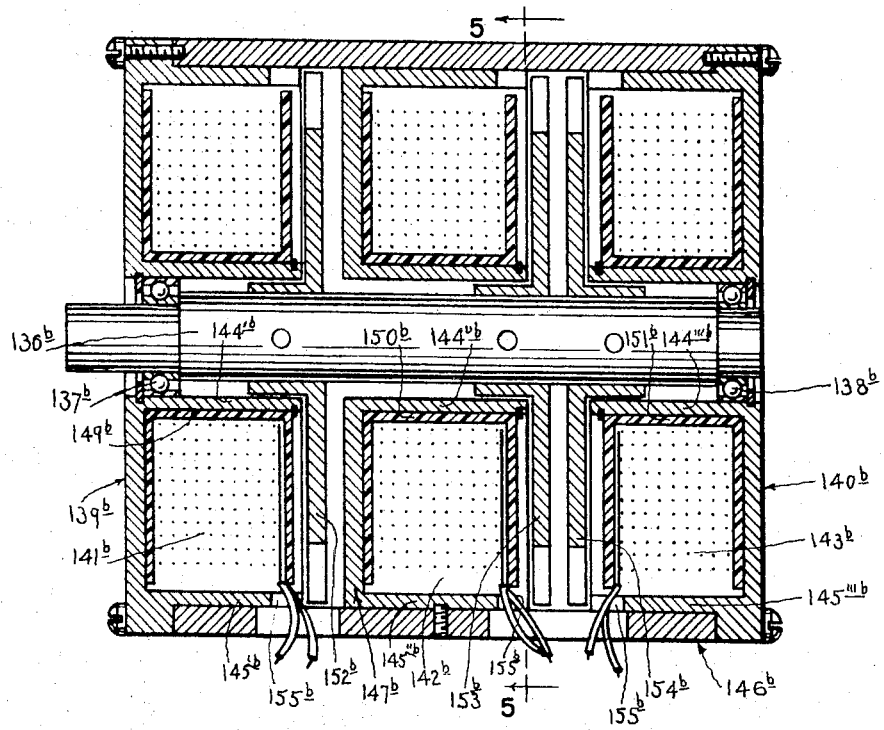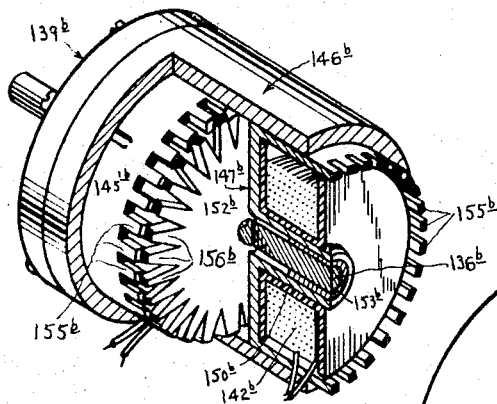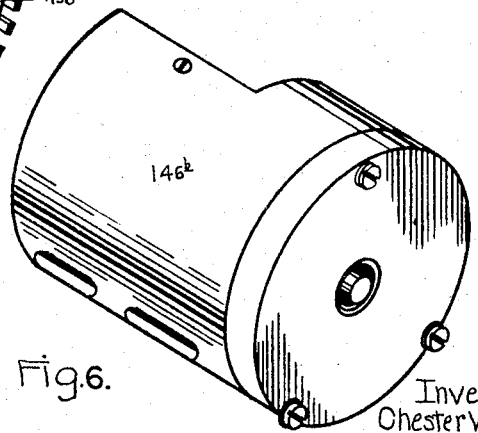

March 5, 1968

C. W. LYTLE ETAL 3,372,291

MOTOR DRIVES FOR CONTROL RODS OF REACTORS, AND THE LIKE

Original Filed June 20, 1960

Inventors:
Chester W. Lytle,
Robert V. Suhrke &
William A. Bradley,
by Thos. A. Banning Atty.

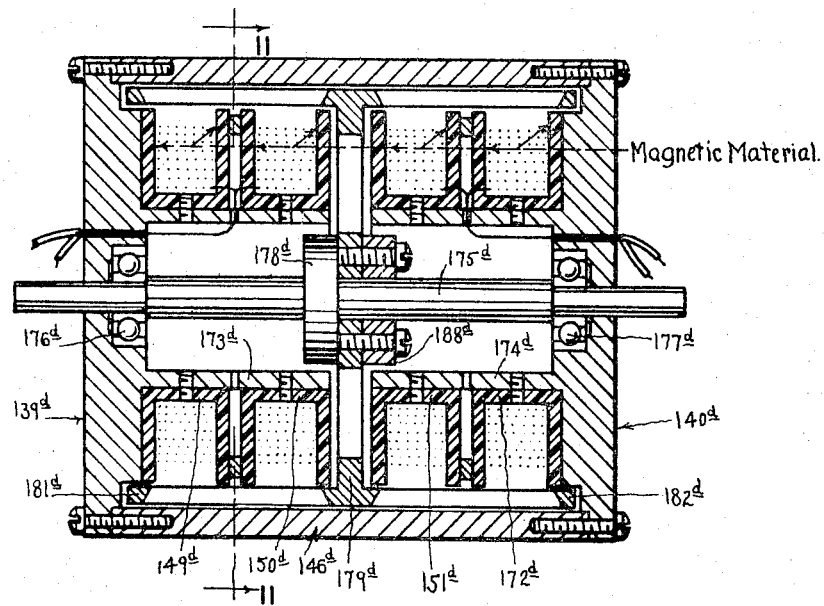

United States Patent Office 3,372,291
Patented Mar. 5, 1968

3,372,291
MOTOR DRIVES FOR CONTROL RODS
OF REACTORS, AND THE LIKE
Chester W. Lytle and William A. Bradley, Albuquerque, N. Mex., and Robert V. Suhrke, Colorado Springs, Colo., assignors to Thomas A. Banning, Jr., Chicago, Ill.
Original application June 20, 1960, Ser. No. 37,503, now Patent No. 3,264,502, dated Aug. 2, 1966. Divided and this application Aug. 1, 1966, Ser. No. 578,951
4 Claims. (Cl. 310—49)

ABSTRACT OF THE DISCLOSURE

A stepping motor having a plurality of circular sections, each section including a stator and magnetic disk rotor in axial alignment with each other and all elements having equally angularly spaced teeth. The stator and rotor of each section are in full registry, upon the sequential energization of each section.

This invention relates to improvements in motor drives for control rods of reactors, and the like. This application is a division of our co-pending appplication, Ser. No. 37,503, filed June 20, 1960, allowed Jan. 25, 1966, and which became Letters Patent of the United States, No. 3,264,502, Aug. 2, 1966.

In that parent application we have disclosed improved forms of stepping motors, which are adapted for use in connection with control rod operations, as shown and claimed in such parent case. Such stepping motors are also of structures which adapt them for many other uses than aforesaid, various of such uses being of a nature and specifications for small motor units. Included in such other uses may be mentioned, various forms of calculating operations, and for driving various instrumental elements, all of which operations are of a nature requiring small torque outputs of the motors, but requiring maximum dependability and certainty of stepping operations. The motor structures hereinafter shown and described are of forms constituted to assure such dependability and certainty of operations. They are also of forms which may be readily produced in small sizes, such as overall diameters of two inches or less, and with numerous teeth in the companion stators and rotors, say thirty-six teeth on each such elements, or more.

At the outset the term "stepping motor" as herein used, contemplates a motor including a stator element and a rotor element corresponding thereto. Generally, but not necessarily, the companion stators and rotors of such motor, are provided with equal numbers of teeth, so that such a motor section may have its stator teeth and its rotor teeth brought into uniform registry throughout each complete rotation of the rotor (or of the stator, in a case wherein the "rotor" element remains stationary while the stator element is journalled for rotation, or a case wherein both the stator and the rotor elements are journalled for rotation). Thus, with such a relation between the numbers of rotor and stator teeth (equality), there may occur a number of such tooth registrations equal to the number of teeth present on each element, during each full rotational operation of either the rotor or the stator with respect to the other element. A similar relationship between the teeth of the two elements may also occur when one of the elements is provided with an even number of teeth, and the other element is provided with a number of teeth which is exactly divisible into such even number of teeth of the first mentioned element.

We also contemplate that such stepping motor shall include a plurality of such motor sections as described above, for example, three motor sections. In such case the rotors of the three sections are drivingly connected together so that they must rotate as a unit; and the rotor sections are so related, under such unit drive conditions, that when the teeth of any rotor section are exactly registered with the teeth of the corresponding stator section, the teeth of the other two motor sections are related to the teeth of the corresponding stator sections, such that the teeth of one such other motor section's rotor and stator elements, are non-registered with the teeth of the corresponding stator section by an angular disparity of one-third the angular distance between the teeth of a section element, and that the teeth of the other such motor section's rotor and stator elements, are non-registered with the teeth of the corresponding stator section by an angular disparity of two-thirds the angular distance between the teeth of such motor section's rotor and stator elements.

Provision is made for magnetizing the teeth of each section is a spatial sequence depending on the desired direction of rotational torque. Such magnetizing means comprises a coil set into the structure corresponding to each section of the motor; together with means to deliver pulses or short timed currents, to the coils of the motor in proper sequence.

When the stepping motors are of small size, such as might be specified for a calculating or counting mechanism, the teeth of the several sections, and the spacing of such teeth, are of small dimensions, such that magnetic forces produced between the rotor and stator teeth of a section are considerable, in relation to the sizes and strengths of such teeth. It is a primary object ofthe present invention, to make structural provisions in the rotor and stator elements of a motor, such as may most effectively meet the magnetizing forces thus encountered. Thereby bending or distortions of the teeth may be most effectively prevented or controlled, with corresponding operational benefits. We have hereinafter disclosed several embodiments of stator and rotor structures constituted to meet the operational conditions imposed by the magnetic forces thus developed. We have also disclosed structural designs constituted for ready and convenient shop production, and assembly of parts.

Referring to the operational functions which require the delivery of successive pulses to the several coils of a motor in a regularly recurring sequence according to the desired direction of rotation, the manner of delivery of such pulses to the coils, will depend largely on the form of the operations of which the stepping motor constitutes a unit. When the pulses to be counted, or the rate of rotor rotation to be produced, are such as to make it desirable to deliver pulses to the individual stator sections at a rate other than the rate of the received primary pulses, proper provision must be made to produce secondary pulses by the reception of the primary pulses, but at the increased or decreased rate desired for delivery to the stator coils. An example, of such a condition might be an installation wherein the receipt of each primary pulse should produce three secondary pulses, distinctly separated from each other, and supplied to the three coils of the three stators of a three section motor unit. With such an arrangement, each received primary pulse would deliver the three secondary pulses in fast succession, to the three coils of the stator sections of the motor unit, thus advancing the rotor an angular amount determined by the full spacing between successive stator (and rotor) teeth. We have herein disclosed circuitry whereby such operations, and other operations, may be produced.

Other objects and uses of the invention will appear from a detailed description of the same, which consists in the features of construction and combinations of parts hereinafter described and claimed.

In the drawings:

FIGURE 4 shows a longitudinal section through another embodiment of stepping motor suitable for use in various operations; and in this embodiment the teeth of the rotor are brought into axial alignment with the teeth of the stator at the successive pulse produced angular steps; the rotor teeth being of radial dimension to match the teeth of the stator in axial alignment;

FIGURE 5 is a partially cut away perspective view of the unit shown in FIGURE 4, and on smaller scale than said FIGURE 4;

FIGURE 6 is a partial perspective outside view of that portion of the unit which is cut away in FIGURE 5;

Figure 7:
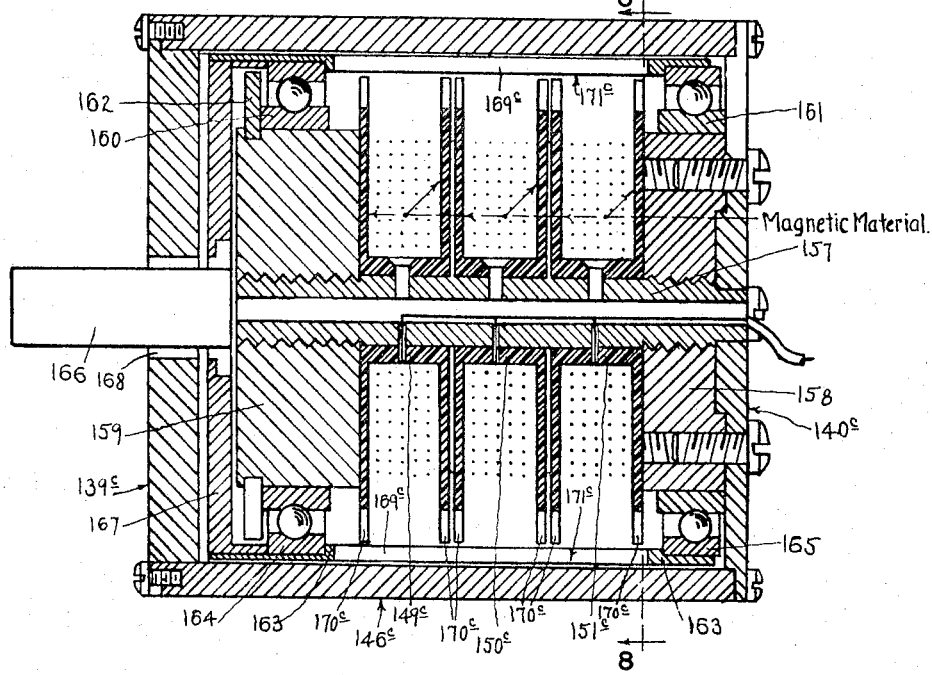
Figure 8:
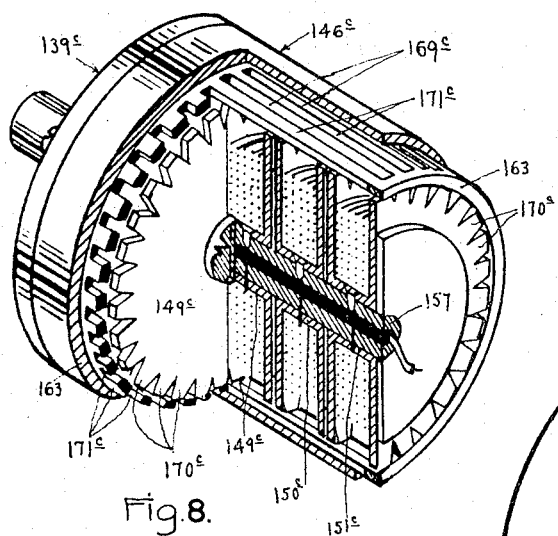
Figure 9:
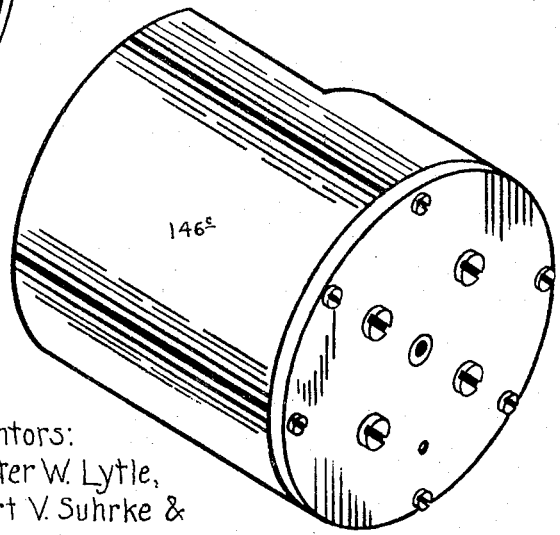

FIGURE 7 shows a longitudinal section through a third embodiment of stepping motor suitable for use in various operations; and in the present embodiment the teeth of the rotor are brought into radial alignment with the teeth of the stator at the successive pulse produced angular steps; the rotor teeth being continuous over all three of the stator sections and being formed by cutting slots axially along a cylinder of magnetic material, as by a milling or slotting operation;

FIGURE 8 shows a partially cut-away perspective view of the unit shown in FIGURE 7, and on smaller scale than said FIGURE 7;

FIGURE 9 is a partial perspective outside view of that portion of the unit which is cut-away in FIGURE 8;

FIGURE 10 shows a longitudinal section through a fourth embodiment stepping motor suitable for use in various operations; and in this embodiment of such motors the stator is located within the body of the rotor instead of being external to such rotor as in the embodiments of FIGURES 1 to 3, and FIGURES 4 to 6; and in the present embodiment the teeth of the rotor are brought into radial alignment with the teeth of the stator at the successive pulse produced angular steps; the rotor teeth being formed in cylindrical axially extending extensions of a central flange which is normal to the axis of rotation, such teeth being formed by cutting slots axially along the two cylindrical extensions, as by a milling or slotting operation, such cylindrical extensions being formed by magnetic material;

FIGURE 11 is a partially cut-away perspective view of the unit shown in FIGURE 10, and on smaller scale than said FIGURE 10;

FIGURE 12 is a partial perspective outside view of that portion of the unit which is cut-away in FIGURE 11.

Four embodiments of stepping motor suitable for various operations are shown in FIGURES 1 to 12, inclusive. These are described as follows:

Three of such embodiments each include a three section stator with its teeth and exciting coil, so that the pulses A, B and C are to be delivered to such coils in sequence, either as the sequence A, B, C, A, and repeat, or as the sequence A, C, B, A, and repeat, according to the desired direction of rotor rotation. Likewise each of these motor embodiments includes three rotor sections corresponding to such stator sections, there being the same number of teeth on each of the stator sections of each embodiment, equidistantly spaced around such section; and likewise the same number of teeth on each rotor section, equidistantly spaced around each rotor section, so that as each rotor section comes into registry with its stator section all of the corresponding rotor teeth register with the corresponding stator teeth of such section. Also, the arrangement in each such embodiment is such that the registrations of its rotor and stator teeth of its three sections occur sequentially for each direction of rotation, the rotor teeth of rotor sections A, B and C coming into registry with the stator teeth of the stator sections A, B and C in sequential succession, or with such registration according to the sequence A, C, B, depending on the sequence of stator coil electrifications. Thus each embodiment is so designed that the total number of electrical pulses needed to produce each complete rotor rotation is equal to the product of the number of rotor (or stator) teeth of a section multiplied by the number of sections in the unit. For example, with thirty teeth in each rotor section, and three sections as shown in the drawings, FIGURES 1 to 9, inclusive, each such embodiment will require ninety pulses per rotation of the rotor, being thirty pulses delivered to each stator section coil.

For purposes of simplicity of description, and to avoid needless repetition, we shall, in describing the four embodiments of stepping motors herein illustrated, use like numerals in the several embodiments to designate like elements, with the suffixes a, b, c, and d for the embodiments of FIGURES 1, 4, 7 and 10 (and the detail figures corresponding respectively thereto).

Figure 1:
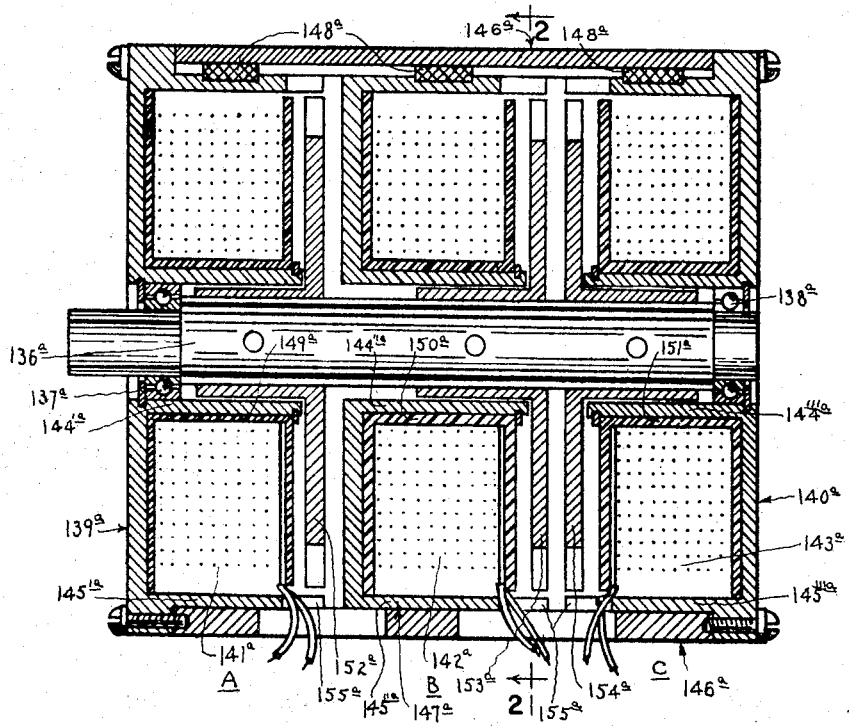
FIGURE 1 shows a longitudinal section through one embodiment of stepping motor suitable for use in various operations; and in this embodiment the teeth of the rotor are brought into radial alignment with the teeth of the stator at the successive pulse produced angular steps; the rotor teeth being of radial dimension to rotate within the stator teeth.
Figure 2:
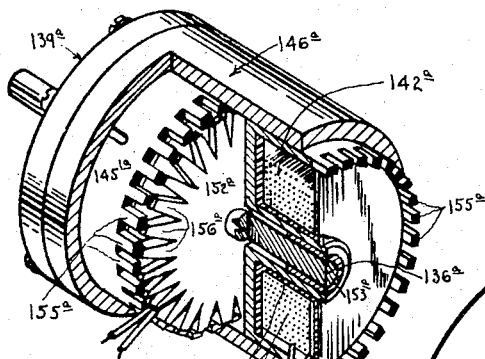
FIGURE 2 is a partially cut-away perspective view of the unit shown in FIGURE 1, and on smaller scale than said FIGURE 1.
Figure 3:
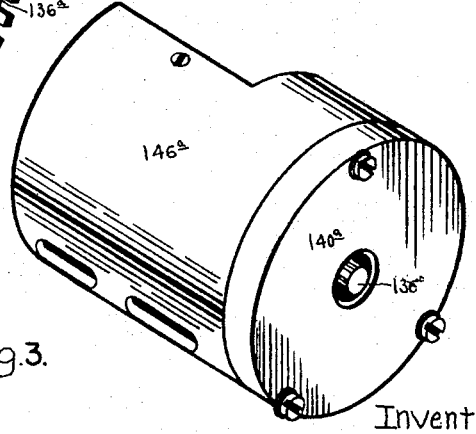
FIGURE 3 is a partial perspective outside view of that portion of the unit which is cut away in FIGURE 2.

In the embodiment of FIGURES 1, 2 and 3, there is incorporated the motor shaft 136 journalled by the ball-bearings 137 and 138 to the right and left-hand elements of the stator, respectively, numbered 139 and 140. These end elements 139 and 140 constitute portions of the magnetic circuits of the stator sections A and C, respectively, and accordingly, are made of magnetic material. Each such end element is of rather deep U-shape to provide in such element an annular channel for accommodation of corresponding stator coils 141 and 143 (coil 142 will be referred to presently). Thus, each such element includes the inner and outer circular flanges 144 and 145, respectively. Corresponding inner and outer circular flanges of the two end stator elements and of the central element, are numbered with like numberings, but all of such circular flanges carry the suffixes ′, ″, or ‴, for the stator sections reading from left to right of the figure. The two end stator elements 139 and 140 are suitably shouldered to receive the cylindrical body element 146 to which such elements 139 and 140 are securely connected, as by the screws shown in the figure. Preferably such body element 146 is made of non-magnetic material so as to reduce magnetic leakage thereto from the outer circular flanges 145 of the sections 139, 140 and 147, and particularly such leakage from or to the stator teeth presently to be described. If desired, portions of each cylindrical element 146 may be made of reduced thickness, shown by comparison of the top and bottom portions of such element in FIGURE 1. Then liners 148 of non-magnetic material may be set between the outer surfaces of the outer circular flanges 145 and the inner surfaces of the element 146, as shown at the top of FIGURE 1. Thereby all of the elements 139, 140 and 147 are accurately and securely retained in exact axial alignment, and against rotation in the frame of the motor.

The three bobbin wound coils 141, 142 and 143 are wound on their bobbin type insulating spools 149, 150 and 151, respectively, such spools having the side flanges and being open at their outer perimeters, as shown in FIGURE 1, so that the windings may be wound on such spools in conventional manner, making it possible to use specially insulated wire. Study of the physical construction of FIGURE 1 will also show that such bobbin wound coils may be successively set into position on the inner circular flanges 144 of the several stator elements 139, 140 and 147 during the process of endwise successive assembly of the motor components. Suitable openings are provided in the cylindrical elements 146 to pass the terminal wire connections of such stator coils, as shown in FIGURE 1.

In the construction of FIGURE 1 (and FIGURES 2 and 3), the rotor elements corresponding to the stator elements comprise the flange members 152, 153 and 154 which extend out radially between the proximate portions of successive stator elements. Conveniently the two radial elements for the stator sections B and C are brought out between the two coils 142 and 143 for such sections to avoid bringing one of such radial elements out at the end of the structure. It is here noted however, that with such arrangement the two flange elements 153 and 154 are far enough apart to avoid material or noticeable cross magnetic effects between the two sections B and C. Each such radially flanged element is also provided with a hub portion which is seated on and secured to the shaft 136. Such securement may be by cross-pinning as shown, or otherwise. Conveniently, also the several coils are secured in place on the respective circular flanges 144 by conventional spring ring type locking as shown in FIGURE 1.

As shown in FIGURE 2, each of the outer circular flanges 145 of the elements 139, 147 and 140 is provided with a series of axially extending teeth 155, spaced equidistant around the edge of such flange far enough to come into radial alignment with corresponding teeth 156 of the edge of the corresponding stator radial flange 152, 153 or 154, as the case may be. There are the same number of teeth on the rotor radial flange as on the stator axial flange (or a multiple thereof), so that registry of all of the rotor teeth of a section will occur with corresponding stator teeth, once for each angular advance of the rotor equal to the angular spacing of the teeth on a section. Also, as already explained, the stator teeth 155 and the corresponding rotor teeth 156 of the three sections are so located angularly, the teeth of the rotor sections with respect to each other and with respect to the teeth of the stator sections, that during rotor rotation the rotor teeth and the corresponding stator teeth come into registry for the three sections in succession, but with all rotor teeth of each section coming into registry with all stator teeth of such section, at the same time.

It is noted that the constructions just described are such that ready assembly of parts is possible, and also, that due to the relationship between the rotor and stator teeth, being radially aligned with each other, very small clearances or air-gaps may be successfully employed between such rotor and stator teeth. This is due to the fact that radial alignments and clearances as small as of the order of one mil (1/1000 inch) between the rotor and stator teeth of a section may be established and maintained when such alignments and clearances are radial in form, as distinguished from being axial clearances. Exact radial maintainance can be secured much more readily and conveniently than any corresponding exactness when the tooth alignments are axial. In this connection it is also explained that for small size motors of the design of FIGURES 1, 2 and 3 (say, 2½ or 3 inches overall diameter, the rotor and stator teeth are small, with correspondingly small stiffness) (due to small thickness). Such teeth are therefore liable to bend when subjected to axial forces due to axial alignment with the stator teeth. Such slight bending draws rotor and stator teeth closer together, with corresponding reduction of air-gap, and greatly increased attractive force between the stator and rotor teeth, thus axially aligned. Per contra, the stator and rotor teeth of the radially aligned structure, are subject to radial forces due to magnetic attractions between such rotor and stator teeth. Deformations of such rotor teeth cannot occur; and reduction or change of air-gap values can only occur when the magnetic forces are great enough to bend the rotor shaft. Such a contingency is practically non-existent.

The embodiment shown in FIGURES 4, 5 and 6 is substantially the same as that shown in FIGURES 1, 2 and 3, just described, with the exception that in the showing of FIGURES 4, 5 and 6 the parts of the stator and rotor elements are so arranged that the rotor teeth 156$^b$ register with corresponding stator teeth 155$^b$ axially instead of radially as in the first embodiment. Such axial registry of the companion teeth presents certain advantages when the motor is of rather large size; since, therein sufficient stiffness of the rotor teeth may be secured to prevent the tooth deflections already referred to.

Referring next to the embodiment shown in FIGURES 7, 8 and 9, in this case the rotor and stator have been interchanged as respects their relative positions radially of the unit. To this end the stator sections are mounted on a central stationary rod or carrier, instead of mounting them on the outer frame element; and the rotor teeth are carried by a rotor element which is exterior to such stator element, and rotatably mounted on such exterior portion of the stator element. This design is as follows:

A stiff rod or stationary shaft element 157 is firmly secured to the right-hand frame element 140$^c$ and extends leftwardly almost to the left-hand frame element 139$^c$. Such right-hand frame element is conveniently provided with the circular block 158 secured to its inside face and of sufficient thickness to enable secure threading of the rod 157 thereto, as shown in FIGURE 7. Another circular block 159 is secured to the left-hand end of such rod element 157; and the inner raceways of ball-bearing elements 160 and 161 are seated onto such blocks. Preferably the inner raceway of the left-hand ball-bearing is locked against leftward shift on such block 159 by the spring retainer ring 162 so that leftward shift of such ball-bearing raceway 160 cannot occur. The inner raceway 161 of the right-hand ball-bearing is capable of slight shift on the block 158 for self-adjustment of its position thereon.

A cylindrical rotor element 163 has its end portion slightly undershouldered and seated on the perimeters of the outer raceways 164 and 165 of the two ball-bearings, the element 163 being, if desired, secured to such outer raceways by press fit, or otherwise, and with the shoulders of such element 163 brought against the outer raceways as shown in FIGURE 7. A leftwardly extending shaft element 166 is secured to an end plate 167 which is set into a leftward projecting portion of the rotor element 163 and secured to such rotor element in position that such end 167 slightly clears the left-hand block 159 of the stator element. Such shaft element 166 is accommodated through an ample size opening 168 in the end element 139$^c$ of the motor housing.

In the present embodiment the bobbins 149$^c$, 150$^c$ and 151$^c$ on which the three stator coils are wound are comprised of magnetic material so that upon energizing each such coil the two peripheral portions of its bobbin are magnetically energized, one North and the other South. The flux thus produced must then flow axially between such peripheral portions, either directly through a large air-gap between such peripheral portions or otherwise. It is understood that the cylindrical element 163 is formed of magnetic material.

Such cylindrical element is provided with longitudinally extending slotted openings 169 angularly spaced to correspond to the angular spacings of the stator teeth, which stator teeth 170$^c$ are formed in the peripheral flanges of the respective bobbin walls. The slotted openings 169 above referred to provide axially extending narrow bars 171$^c$ which are also angularly spaced around the rotor element 163 at spacings to correspond to the spacings of the stator teeth 150$^c$, being also equal in number to the teeth at each side of a stator coil. Since the rotor teeth corresponding to all three of the stator sections are in axial alignment with each other, as evident since such bars 171$^c$ are conveniently cut straight along the element 165, it follows that the several stator sections must be so set angularly on the rod element 157, that the stator teeth break joints angularly with each other one-third of a tooth angular spacing between the successive stator sections. By this arrangement, upon energizing the three stator coils in regular succession, and by a pre-determined sequence of energizations, the desired magnetic effects between the stator and the rotor teeth will be produced.

Preferably with this embodiment of FIGURE 7, the two end frame blocks 158 and 159 should be made of non-magnetic material so as to not magnetically affect the intended flux flow at maximum value through the several stator teeth.

The design of FIGURES 7, 8 and 9 presents certain advantages over other designs, including great ruggedness of mechanical structure, simplicity of manufacture of the rotor with its teeth, ease of assembly, and ability to effectively control close tolerances in manufacture. It is also noted that although the cylindrical portion 163 of the rotor is of maximum radius, lying as it does outside of the stator element teeth, still the rotational inertia of such rotor element is small due to the fact that such cylindrical element is light, having a large part of its material cut away in the slots 169c, and also due to the fact that such cylindrical element does not have connected to it radially extending rotative elements for its support. This smallness of rotative inertia is very important when fast responses to the pulses delivered to the stator coils are very important.

Next referring to the embodiment shown in FIGURES 10, 11 and 12, this may be termed in a sense as a hybrid between the embodiment of FIGURES 7, 8 and 9, and either of those of FIGURES 1, 2 and 3, or FIGURES 4, 5 and 6, since the present embodiment of FIGURES 10, 11 and 12 incorporates the features of providing the rotor teeth in the form of axially extending bars travelling in a cylindrical path around the outsides of the stator teeth, combined with the support of such tooth form by a centrally extending shaft and without the need of using large ball-bearings such as those shown in FIGURES 7, 8 and 9 for support of such rotor tooth element.

In the embodiment of FIGURES 10, 11 and 12 the motor frame includes the end plates or blocks 139d and 140d together with the cylindrical housing or shell 146d secured to such end elements. Each of the end elements is provided with an inwardly extending circular flange 173d or 174d as the case may be, such flanges being in axial alignment and terminating short of each other to leave a central space between their inner ends. In the illustrated embodiment there are provided four sections of stator and rotor elements and teeth, instead of three as is previously described in earlier embodiments, and the matching of the rotor and stator teeth of the four sections are correspondingly produced by off-setting the teeth of the sequentially energized sections one-fourth of a tooth angularly instead of one-third of a tooth as previously. That is, in this embodiment the sequence would be A, B, C and D, and repeat, or A, D, C and B, and repeat for reversal. The number of pulses required for each rotation of the rotor would correspondingly be four times the number of teeth of each stator (or rotor), instead of three times such factor as in the previous embodiments.

Two of the stator magnetizing elements are mounted on each of the circular flanges 172d and 174d as shown at 149d and 150d on the flange 173d, and 151d and 172d on the flange 174d. Each of these magnetizing elements includes a bobbin type coil with the bobbin itself formed of magnetic material, and with the flange edges provided with the teeth 170d as shown in FIGURE 11. It is here noted that in the present embodiment such stator teeth 170d are axially deep, extending practically the full radial dimension of the flange portion of the bobbin, whereas in the previous embodiments of FIGURES 1, 4 and 7 the stator teeth are of varying degrees of axial dimension. The bobbins of FIGURE 10 are secured to their respective flanges in convenient manner.

Extending axially through the present embodiment is the shaft 175d journalled in the end elements 139d and 140d by the ball-bearings 176d and 177d, as shown in FIGURE 10. This shaft is conveniently retained against endwise displacement, as by provision of the shoulders or sockets into which the ball-bearings are set, and the provision of the shoulders on the shaft, engaging the inner raceways of such bearings, as shown in FIGURE 10.

The central portion of such shaft is provided with a collar portion 178d to which is secured the radially extending flange 179d of the rotor element, the hub portion of such rotor flange being gripped between the collar 178d and a ring 180d by tie bolts as shown in FIGURE 10. The peripheral portion of such radial flange 179d carries the two cylindrical rotor portions 181d and 182d extending in opposite directions axially, such cylindrical portions being of axial dimension sufficient to overlie the stator portions and coils 149d and 150d, within the portion 181d, and to overlie the stator portions and coils 151d and 172d, respectively. Each of such cylindrical sections 181d and 182d is provided with axially extending slots shown at 183d and 184d, respectively, in FIGURE 11, leaving the teeth 185d and 186d in such cylindrical sections. These teeth are of number and angular spacing to co-operate with the teeth of the corresponding stator elements in manner already explained.

This embodiment of FIGURES 10, 11 and 12 presents the advantage as compared to that of FIGURES 7, 8 and 9 that the use of large size ball-bearings is avoided. Also that the stator elements may be conveniently assembled into position on the two cylindrical elements 173d and 174d prior to bringing the two halves of the motor together into the outer shell 146d with the rotor element in place. Other advantages of this construction will also suggest themselves to the student of the device.

The pulses for operation of the stepping motors must be D.C. pulses for best operation. Accordingly, in various of the forms of circuitry now to be described, provision has been included for rectification of conveniently available D.C. supply. In some cases the use of A.C. is also desirable for production of operations other than the pulsing of the motor drive. Thus, an A.C. supply will usually be desirable.

We claim:

1. A stepping motor comprising in combination, a plurality of circular sections, each section including a circular stator element and a companion circular rotor element, all said elements being in axial alignment with each other, each stator element comprising a circular open sided channel shaped body of magnetically permeable material the open side whereof is located at one radial face of such element and the flanges of which channel extend axially and comprise inner smaller radius and outer larger radius cylindrical bodies respectively, frame means surrounding all of said stator and rotor elements, supporting connections between said frame means and all of the stator elements to retain said stator elements in axial alignment and against rotation with respect to each other, a shaft extending axially through all of the stator elements, means to journal said shaft to the frame means, each rotor element comprising a radial disk element of magnetically permeable material mounted on and secured to the shaft with the face of the central portion of such disk element connected to an axially extending tube within the small diameter flange of the corresponding stator element and of smaller size than said stator element flange and with the perimetral edge of said disk rotor element within and in radial alignment with the edge of the large radius cylindrical body of such stator element, the edge of each larger radius cylindrical body stator element being provided with a plurality of axially extending equally angularly spaced teeth, and the perimetral edge of each disk rotor element being provided with equally angularly spaced teeth of angular spacing to simultaneously match radially, and register with, teeth of the corresponding stator larger radius cylindrical body during rotor rotation, with the teeth of the several rotor elements registering with teeth of the corresponding stator larger radius cylindrical bodies in sequence during shaft rotation, with cycles of such registration, each such cycle including register of the teeth of each rotor element with teeth of the corresponding stator cylindrical body element, together with means to generate a magnetomotive force in each stator element comprising a coil seated in the circular channel of the corresponding stator element.

2. A structure as defined in claim 1, wherein the means to generate a magnetomotive force in each stator element comprises a circular perimetrally open bobbin seated within the circular channel of such stator element, together with a winding within such bobbin.

3. A stepping motor comprising in combination a plurality of circular sections, each section including a circular stator element and a companion circular rotor element, all said elements being in axial alignment with each other, each stator element comprising a circular open sided channel shaped body of magnetically permeable material the open side whereof is located at one radial face of such element and the flanges of which channel extend axially and comprise inner smaller radius and outer larger radius cylindrical bodies respectively, frame means surrounding all of said stator and rotor elements, supporting connections between said frame means and all of the stator elements to retain said stator elements in axial alignment and against rotation with respect to each other, a shaft extending axially through all of the stator elements, means to journal said shaft to the frame means, each rotor element comprising a radial disk element of magnetically permeable material mounted on and secured to the shaft with the face of the central portion of such disk element connected to an axially extending tube within the small diameter flange of the corresponding stator element and of smaller size than said stator element flange and with the perimetral edge of said disk rotor element extending radially outward into axial registry with the edge of the larger radius cylindrical body of such stator element, the edge of such larger radius cylindrical body stator element being provided with a plurality of axially extending equally angularly spaced teeth, and the perimetral edge of each disk rotor element being provided with equally angularly spaced teeth of angular spacing and radial dimension to simultaneously match and register axially with teeth of the corresponding stator larger radius cylindrical body during rotor rotation, with the teeth of the several rotor elements registering with teeth of the corresponding stator larger radius cylindrical bodies in sequence during shaft rotation, with cycles of such registration, each such cycle including register of the teeth of each rotor element with teeth of the corresponding stator cylindrical body element, together with means to generate a magnetomotive force in each stator element comprising a coil seated in the circular channel of the corresponding stator element.

4. A structure as defined in claim 3, wherein the means to generate magnetomotive force in each stator element comprises a circular perimetrally open bobbin seated with the circular channel of such stator element, together with a winding within such bobbin.

References Cited

UNITED STATES PATENTS

| 3,005,118 | 10/1961 | Ranseen | 310—49 |
| 3,119,941 | 1/1964 | Guiot | 310—49 |

FOREIGN PATENTS

| 631,916 | 6/1936 | Germany. |
| 934,956 | 5/1963 | Great Britain. |
| 1,237,875 | 6/1960 | France. |

MILTON O. HIRSHFIELD, *Primary Examiner.*

G. NUNEZ, *Assistant Examiner.*